(No Model.)
J. LEE.
SOLDERING IRON.
No. 339,907. Patented Apr. 13, 1886.
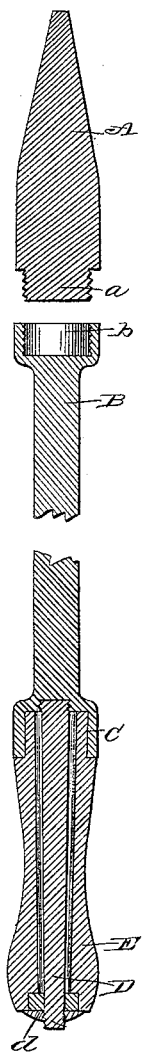
Witnesses
Howard J. Schneider
Jno. D. McGill
Inventor
John Lee,
By Myers & Co.
Attorneys.

UNITED STATES PATENT OFFICE.

JOHN LEE, OF STERLING, OHIO.

SOLDERING-IRON.

SPECIFICATION forming part of Letters Patent No. 339,907, dated April 13, 1886.

Application filed August 25, 1885. Serial No. 175,265. (No model.)

*To all whom it may concern:*

Be it known that I, JOHN LEE, a citizen of the United States of America, residing at Sterling, in the county of Wayne and State of Ohio, have invented certain new and useful Improvements in Soldering-Irons, of which the following is a specification, reference being had therein to the accompanying drawing.

This invention pertains to improvements in soldering-irons, having for its object to render the tool more efficient and durable and convenient in handling and carrying; and it therefore consists of the detailed construction and combination of the parts, substantially as hereinafter described and claimed.

In the accompanying drawing the figure illustrates a longitudinal section of my invention.

In the organization of my invention I employ a soldering-head, A, of the usual construction, connecting thereto by a screw-threaded and socket connection or joint, and a shank or stem, B, the further construction of which shank will be described farther on. I however make the screw $a$ of the head A of copper, which is more expansible, as well known, than iron, of which I make the socket $b$ of the shank B, which screw and socket, as above intimated, serve to effect the connection of the head to the shank, whereby when the head is put into the fire, as practiced in using the same, as well understood, the greater expansion of the copper screw will retain the head and iron shank rigidly together, instead of permitting the loosening of the same, as would be the case, as is obvious, were the screw made of a less expansible metal than that of the socket, as has heretofore been done. The outer end of the shank or stem B is formed with a ferrule or cap, C, while projecting centrally from the inside of the cap or ferrule C is a tang, D, having its free end screw-threaded, and its other end also having a screw-thread formed thereon, and inserted in a correspondingly-shaped aperture in the shank or stem B, having a female screw-thread formed therein; or said tang can, if desired, be made integral with said shank or stem.

E is the heat-non-conducting or wooden handle, which is provided with a longitudinal central channel or passage for its insertion upon the tang D, said handle fitting at its inner end into the ferrule or cap C, and fastened in place by a nut, $d$, screwed upon the threaded free end of the tang against the outer end of the handle E.

The ferrule or cap C, in addition to aiding the securing of the handle E in place, also serves to shield the handle from the direct or intense action of the heat when the head or iron of the tool is in the fire, and thus prevent the scorching or charring of the handle. It is also remarked that the shank of the tool or iron can be gotten up in quantities, so that the copper head can be readily replaced when unfit for further use, and thus obviate the additional expense of buying an entirely new tool. Furthermore, the several parts of the tool or iron are readily separable or detachable, permitting the same to be conveniently carried in the pocket, especially as would be desirable in going a considerable distance.

Having thus fully described my invention, what I claim, and desire to secure by Letters Patent, is—

The soldering-iron consisting of the head, the shank connected to the head and provided with a ferrule at its outer end, centrally from which projects a tang, and the heat-non-conducting handle fitted and secured upon said tang, its inner end entering the cap or ferrule, substantially as and for the purpose set forth.

In testimony whereof I affix my signature in presence of two witnesses.

JOHN LEE.

Witnesses:
  G. W. ROSS,
  JOHN LEE, Jr.